US012679411B2

(12) United States Patent
Lu et al.

(10) Patent No.: US 12,679,411 B2
(45) Date of Patent: Jul. 14, 2026

(54) COMPUTER-BASED MANAGEMENT OF ACCIDENT PREVENTION IN AUTONOMOUS VEHICLES

(71) Applicant: International Business Machines Corporation, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 18/057,754

(22) Filed: Nov. 21, 2022

(65) Prior Publication Data

US 2024/0166240 A1 May 23, 2024

(51) Int. Cl.
*B60W 60/00* (2020.01)
*B60W 30/00* (2006.01)
*B60W 30/09* (2012.01)
*G16Y 20/10* (2020.01)
*G16Y 40/30* (2020.01)
*G16Y 40/50* (2020.01)

(52) U.S. Cl.
CPC ........ *B60W 60/0015* (2020.02); *B60W 30/09* (2013.01); *B60W 2556/10* (2020.02); *B60W 2556/45* (2020.02); *G16Y 20/10* (2020.01); *G16Y 40/30* (2020.01); *G16Y 40/50* (2020.01)

(58) Field of Classification Search
CPC ............. B60W 60/0015; B60W 30/09; B60W 2556/10; B60W 2556/45; G16Y 20/10; G16Y 40/30; G16Y 40/50

USPC ........................................................... 701/24
See application file for complete search history.

(56) References Cited

U.S. PATENT DOCUMENTS

| | | |
|---|---|---|
| 7,493,202 B2 | 2/2009 | Demro |
| 10,054,947 B2 | 8/2018 | Mays |
| (Continued) | | |

FOREIGN PATENT DOCUMENTS

| | | | | |
|---|---|---|---|---|
| DE | 102014210259 A1 * | 12/2015 | ......... | B60R 21/0134 |
| WO | 2017012470 A1 | 1/2017 | | |

OTHER PUBLICATIONS

English translation of DE-102014210259 (Year: 2015).*

(Continued)

*Primary Examiner* — Tiffany P Young
(74) *Attorney, Agent, or Firm* — Joseph P. Curcuru

(57) ABSTRACT

In an approach to improve improving impact prevention in both manual and autonomous vehicles embodiments of the present invention generate a knowledge corpus based on data collected, from one or more internet of thing (IoT) sensors, associated with one or more predetermined risk factors of one or more predefined risks over time. Further, embodiments receive from the one or more IoT sensors input data to observe a vertical space above a vehicle and identify an object in a predetermined area based on the received input data and the knowledge corpus. Additionally, utilize the knowledge corpus and the input data to generate a risk score for the identified object and responsive to the risk score being above a predetermined threshold, embodiments issue a command for the vehicle to continue to drive or to progress to a predetermined safe zone.

20 Claims, 4 Drawing Sheets

(56) References Cited

U.S. PATENT DOCUMENTS

| 10,513,267 | B2 | 12/2019 | Matei |
| 10,564,639 | B1 | 2/2020 | Zhu |
| 2019/0145787 | A1 | 5/2019 | Akselrod |
| 2019/0202463 | A1 | 7/2019 | Anderson |
| 2020/0372428 | A1* | 11/2020 | Liu .......................... G08G 1/20 |
| 2021/0065554 | A1 | 3/2021 | Florimond |
| 2021/0291815 | A1* | 9/2021 | Smith ................... G06Q 10/00 |
| 2023/0124314 | A1* | 4/2023 | Foster .................... G01S 17/89 |
| | | | 701/26 |

OTHER PUBLICATIONS

Ford, "Ford® Driver Assist Technologies | Ford Co-Pilot 360™", last retrieved from internet Oct. 12, 2022, 8 pages, <https://www.ford.com/technology/driver-assist-technology/?intcmp=cp360-rvc-dat>.
Moss et al., "Autonomous Vehicle Risk Assessment", Stanford University, Stanford Center for AI Safety, Sep. 2020-Jun. 2021, 39 pages.

* cited by examiner

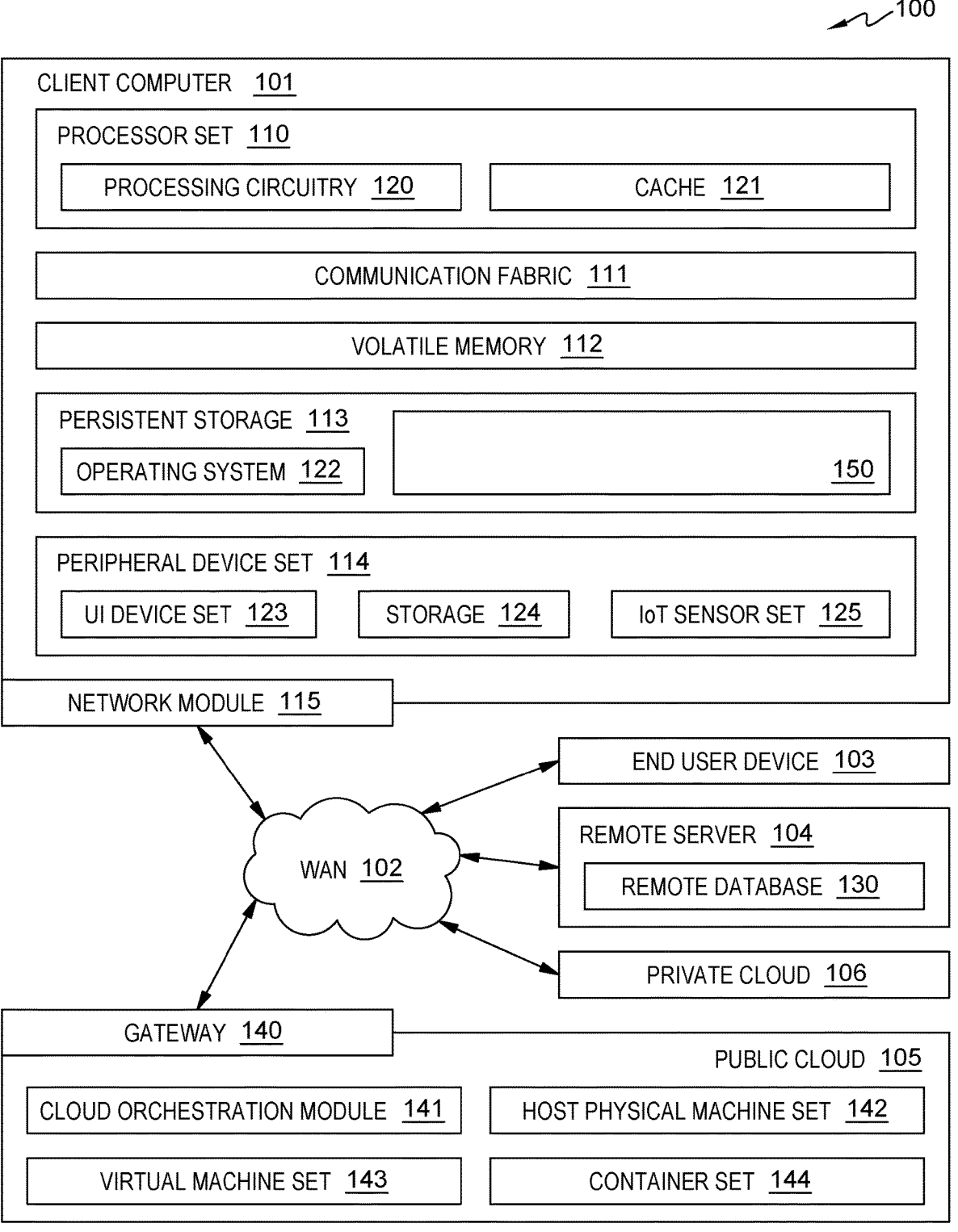

CLIENT COMPUTER  101

PROCESSOR SET  110

PROCESSING CIRCUITRY  120

CACHE  121

COMMUNICATION FABRIC  111

VOLATILE MEMORY  112

PERSISTENT STORAGE  113

OPERATING SYSTEM  122

150

PERIPHERAL DEVICE SET  114

UI DEVICE SET  123

STORAGE  124

IoT SENSOR SET  125

NETWORK MODULE  115

END USER DEVICE  103

REMOTE SERVER  104

REMOTE DATABASE  130

WAN  102

PRIVATE CLOUD  106

GATEWAY  140

PUBLIC CLOUD  105

CLOUD ORCHESTRATION MODULE  141

HOST PHYSICAL MACHINE SET  142

VIRTUAL MACHINE SET  143

CONTAINER SET  144

START

RECEIVING PERMISSION TO TRACK AND MONITOR A VEHICLE  ~ 202

MONITORING A PREDETERMINED AREA  ~ 204

GENERATING A KNOWLEDGE CORPUS  ~ 206

IDENTIFYING RISK OBJECT  ~ 208

TRACKING THE RISK OBJECT  ~ 210

DETERMINING IF THE RISK OBJECT EXCEEDS A PREDETERMINED DANGER THRESHOLD ?  — 212

NO

YES

MOVING THE VEHICLE  ~ 214

END

300

START

MONITORING A
PREDETERMINED AREA                    302

IDENTIFYING A RISK OBJECT             304

IDENTIFYING CHANGES TO
THE PREDETERMINED AREA                306

MOVING THE VEHICLE                    308

END

COMPUTER-BASED MANAGEMENT OF ACCIDENT PREVENTION IN AUTONOMOUS VEHICLES

BACKGROUND OF THE INVENTION

The present invention relates generally to autonomous vehicles, and more particularly to the field of implementing accident/impact prevention in autonomous vehicles.

An autonomous vehicle (e.g., autonomous car) is a mode of transportation incorporating driving automation (e.g., vehicular automation), that is capable of sensing its environment and moving safely with little or no human input. Self-driving cars, for example, combine a variety of sensors to perceive their surroundings, such as thermographic cameras, radar, lidar, sonar, GPS, odometry and inertial measurement units. Advanced control systems interpret sensory information to identify appropriate navigation paths, as well as obstacles and relevant signage. Control methods based on Artificial Intelligence (AI) can then be used to learn all the gathered sensory information in order to control the vehicle and support various autonomous-driving tasks. Autonomous vehicles are predicted to have a comprehensive impact on the automobile industry, health, welfare, urban planning, traffic, insurance, labor market and other fields. Autonomous vehicles are fluent in making driving decision(s); in this case, the autonomous vehicle captures surrounding information, that includes image and video feeds, various scanning information, and IoT feeds.

SUMMARY

Embodiments of the present invention disclose a computer-implemented method, a computer program product, and a system, for improving impact prevention in vehicles, the computer-implemented method comprising: generating a knowledge corpus based on data collected, from one or more internet of thing (IoT) sensors, associated with one or more predetermined risk factors of one or more predefined risks over time; receiving, from the one or more IoT sensors, input data to observe a vertical space above a vehicle; identifying an object in a predetermined area based on the received input data and the knowledge corpus; utilizing the knowledge corpus and the input data to generate a risk score for the identified object; and responsive to the risk score being above a predetermined threshold, issuing a command for the vehicle to continue to drive or to progress to a predetermined safe zone.

BRIEF DESCRIPTION OF THE DRAWINGS

FIG. 1A is a functional block diagram illustrating a distributed data processing environment, executing an impact prevention program, in accordance with an embodiment of the present invention;

DETAILED DESCRIPTION

Figure 1B:
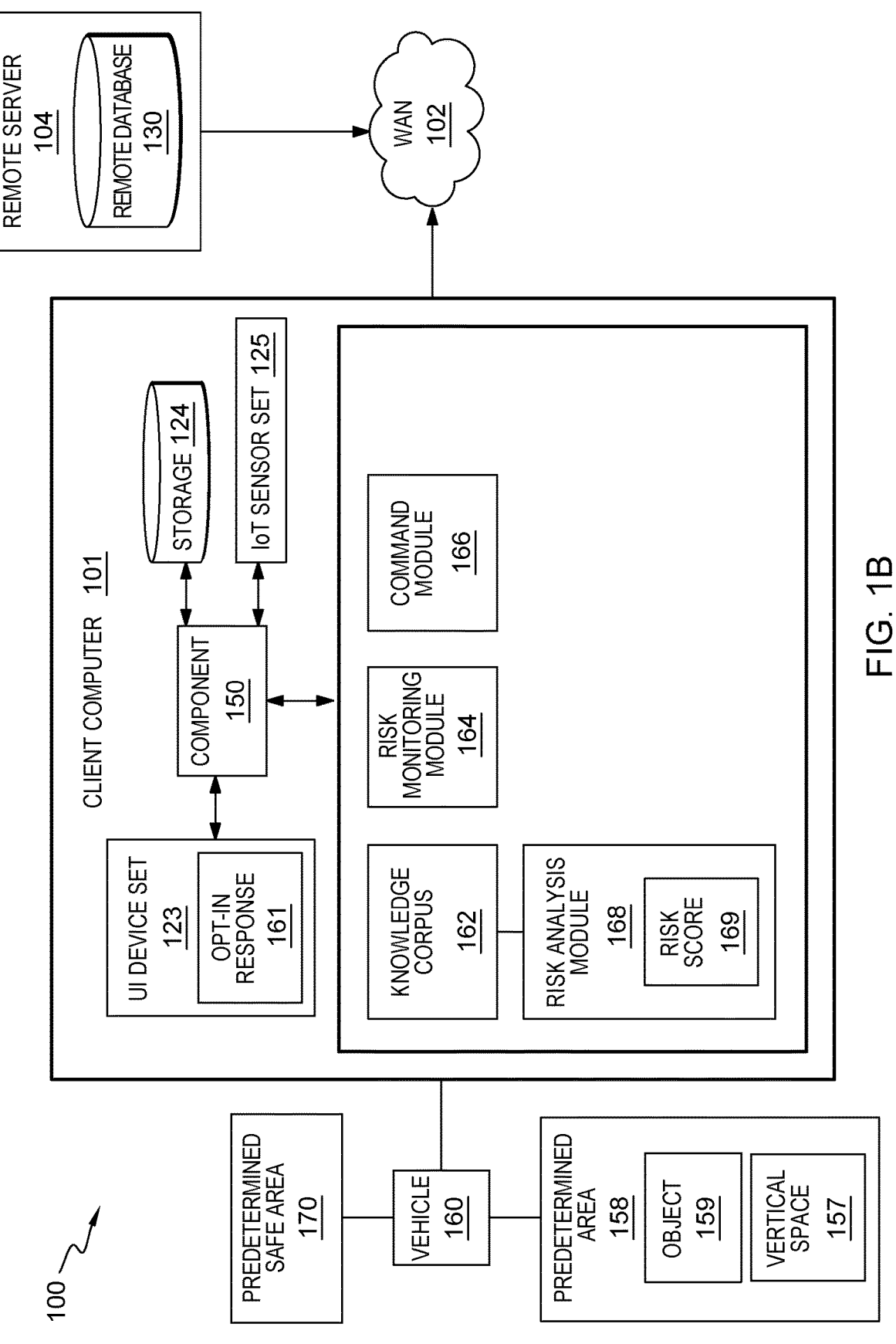
FIG. 1B illustrates a functional block diagram and operational steps of the impact prevention program, on a server computer within the distributed data processing environment of FIGS. 1A, in accordance with an embodiment of the present invention.

Embodiments of the present invention recognize that, in various scenarios, an autonomous vehicle (hereinafter referred to as vehicle) might be damaged from falling trees, falling objects, flying debris, or other nearby "risks" that could impact the vehicle. Embodiments of the present invention recognize that with the existing capability, in the art, the vehicle captures the surrounding information to take the driving decision; however, the current AI enable autonomous vehicle software is not able to identify if a tree, object, or any other physical element might fall or damage the vehicle. For example, a tree falling due to a strong gust of wind resulting in damage to the vehicle (e.g., scratch the paint, smash the roof, and shatter the windshield, etc.). Therefore, embodiments of the present invention recognize that vehicles do not currently consider the safety of parking space within the current process.

Embodiments of the present invention improve the art and solve at least the issues stated above by monitoring changes in ground vibration patterns to predict the likelihood of physical impact from the surroundings of a vehicle and proactively moving the vehicle to a predetermined or identified safe zone. More specifically, embodiments of the present invention improve the art and solve at least the issues stated above by (i) monitoring changes in ground vibration patterns along with other historically learned data related to soil, wind, tree age, tree fall history, etc.; and (ii) predicting if the surrounding is safe for a vehicle from a situation such as, nearby falling tree etc.; and (iii) proactively moving the vehicle from the vehicles current location into an identified or predetermined safe zone. A safe surrounding is defined as a location or position where the possibility of the vehicle being physically damaged by an object in the location or position is below a predetermined threshold (i.e., the likelihood of the vehicle being damaged is below a predetermined threshold).

Implementation of embodiments of the invention may take a variety of forms, and exemplary implementation details are discussed subsequently with reference to the Figures (i.e., FIG. 1A-FIG. 3).

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails, and texts, and/or responsive display prompts begin with a written notification that the user's information may be recorded or monitored and may be saved, for the purpose of consolidating shipments to reduce carbon emissions and shipping costs. These embodiments may also include periodic reminders of such recording and monitoring throughout the course of any such use. Certain embodiments may also include regular (e.g., daily, weekly, monthly) reminders to the participating parties that they have consented to being recorded and monitored for collision avoidance and autonomous vehicle safety measures and may provide the participating parties with the opportunity to opt-out of such recording and monitoring if desired.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as impact prevention program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. IoT sensor set 125 may be any combination of proximity sensors, image sensor, motion sensor, thermistor, capacity sensing, photoelectric sensor, infrared sensor, level sensor, humidity sensor, pressure sensor, temperature sensor, and/or any sensor and/or IoT sensor known and understood in the art.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may be connected to vehicle software that integrates real-time data regarding the driver, the vehicle, and the environment to optimize the in-vehicle experience. Component 150 may receive data from vehicle sensors and uses analytics and AI to understand driver behavior and link to other information systems in a cloud system, such as weather and traffic, to add context and situational awareness. In various embodiments, based on linked and integrated data, component 150 diagnoses safety risks or quality issues and takes immediate action. For example, connecting to real-time weather and traffic conditions to improve the effectiveness of a vehicle's collision avoidance system or rerouting the vehicle based on traffic and/or weather reports.

In various embodiments, component 150 monitors, via IoT sensor set 125, the change in ground vibration pattern along with other historically learned data related to soil, wind, tree age, tree fall history, and/or another metrics known and understood in the art from remote database 130 and/or storage 124 to predict if the surrounding area (i.e., predetermined area or radius from a predetermined point on the vehicle) is safe (i.e., outside of an identified fall zone where an identified object can damage the vehicle) from falling debris (e.g., a falling tree) and proactively moving the vehicle from a current position into a safe zone or predetermined area. A safe zone is an identified or predetermined area outside of an identified fall zone where an identified object can damage the vehicle. A fall zone is an identified area where an identified object may fall and damage the vehicle, wherein the fall zone comprises an identified radius of damage such as a fall radius. Component 150 may analyze a predetermined surrounding area of a vehicle for any potential threat that may fall upon or impact the vehicle and proactively move the vehicle into a safe zone based on received feedback from IoT sensor set 125 and retrieved historic data associated with an identified risk or predetermined area. An area or zone is considered safe when component 150 determines that the likelihood of a predetermined risk is below a predetermined threshold.

In various embodiments, component 150 (i) instructs and/or manages the movement of a vehicle from a high risk area (e.g., a location where component 150 identified one or more objects with a likelihood of falling and damaging the car above a predetermined threshold), (ii) parks the vehicle away from the identified risk related object(s) (i.e., safe zone), (iii) executes an electronic mapping for the identified risk object(s) and autonomously uploads risk to storage 124 and/or remote database 130, (iv) elevates the risk of the situation and any parking route changes, (v) utilizes weather data and soil parameters and soil data to evaluate and analyze the risk of the surrounding area to the vehicle, (vi) monitors, via IoT sensor set 125 vertical risk threats (e.g., branches, building debris, trees, street lights, etc.), (vii) proactively utilizes predetermined social and regional events to evaluate risk (e.g., scheduled holidays and events), and (viii) identifying a parking location risk based on external drivers (or the prediction thereof). In various embodiments, any risk evaluation may be conducted through one or more risk analysis/assessment methods and/or software known and understood in the art.

Component 150 may move a vehicle from a current position based on an identified risk (e.g., when a predetermined risk factor is identified above or within a predetermined radius of the vehicle). For example, if an autonomous vehicle is parked on the roadside and there are trees on one or both sides of the road, then with the sensors attached on the wheels or base of the vehicle, component 150, via the sensors associated with the vehicle, will continue to monitor the change in ground vibration pattern. In this example, component 150 compares the data collected from the ground vibration pattern monitoring with historic ground vibration patterns to predict if a tree is going to fall and damage the vehicle based on the changes in ground vibration patterns. In this example, if component 150 identifies a change in ground vibration patterns, then component 150 proactively instruct the vehicle to autonomously move to a predetermined safe zone. In various embodiments, component 150 compares current data with historic data to determine if the surrounding area is unsafe, wherein, predetermined or identified changes/discrepancies between the current and historic data triggers component 150 to identify the surrounding area as unsafe, and wherein unsafe is defined as the likelihood of an identified object falling and damaging or impacting the vehicle is above a predetermine range. If a surrounding area is identified as unsafe, then component 150 may proactively instruct the vehicle to autonomously move to a predetermined safe zone. In various embodiments, component 150 compares the data collected from the monitored ground vibration patterns to predict by comparing current collected ground vibration patterns with previous ground vibration patterns, wherein component 150 compares the collected ground vibration patterns in predetermined time intervals. In various embodiments, component 150 instructs and/or manages an autonomous vehicle to park away from the identified risk related object(s). For example, based on historical learning regarding the types of trees that have been known to fall or that have been recently falling, wind parameters, ground soil parameters, and/or any other factors known and understood in the art, component 150 identifies which road may be unsafe for parking or operating the vehicle, and accordingly, component 150 identifies the trees and keeps the vehicle a predetermined distance away from the identified trees.

Component 150 may execute and managed an electronic map based on the historical data (e.g., previous incidents and/or accidents, type of object, type of structure) and data collected while the vehicle is driving, wherein component 150 collaborates and updates the electronic map. In a simplistic example, component 150 creates and manages an electronic map based on historical data associated with tree fallings and the type of trees that have been known to fall (e.g., name of trees, height, size, color, size, shape, and/or other metrics known and understood in the art), wherein component 150 updates the electronic map based on the types of trees and the vulnerability of the tree to fall. In this simplistic example, component 150 may generate and issue notifications to the driver/owner of the vehicle, a city administrator and/or vehicle service provider to alert them of the identified risk.

Component 150 may elevate risk situations and parking route changes, based on the updated map or electronic/digital map comprising the location of identified risk objects (e.g., vulnerable trees on the roadside) and the weather parameters (e.g., weather forecast: wind, rain, snowing, etc.), to identify which road is unsafe, and identify a route to a new parking location where the risk situation is below a predetermined threshold. In various embodiments, if a vehicle needs to park on the roadside, then based on the types of tree and soil parameters, component 150 determines if the vehicle can be parked in the current location, wherein the types of tree and soil parameters are measured through image capturing, IoT sensor set 125, and data repository in a knowledge corpus. In various embodiments, if component 150 determines the current location is dangerous (i.e., identifies a potential risk of damage to the vehicle above a predetermined threshold) then component 150 identifies a safe secondary parking location or retrieves a predetermined safe zone.

In various embodiments, while the autonomous vehicle is operating on the road, component 150, via IoT sensor set 126, identifies objects that line the roadside (i.e., roadside specification) of the current road that the vehicle is traveling and identifies whether there is potential vertical risk object that might damage the roof of the vehicle or the vehicle in general. For example, if there are trees, buildings, lamp posts, highway signs, streetlights, and/or any other vertical structures or objects known and understood in the art that could fall and damage the vehicle or can accumulated objects that could fall and damage or impact the vehicle such as but not limited to as accumulated snow and/or construction material. In various embodiments, component 150 considers one or more local holidays or other cultural events wherein the traffic patterns change based on the local holiday or cultural events (e.g., more cars congregating and/or operating in certain areas that could increase the chance of other vehicles parking on the side of the road and getting damaged). In another example, component 150 considers local garbage collection or snow plowing types of events that increase the activity on a roadside and increase the potential of damage to the vehicle.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes predetermined area 158, vehicle 160, client computer 101, and remote server 104 interconnected WAN 102.

In the depicted embodiment, via UI device set 123, component 150 issues and/or receives permission from a user/owner of vehicle 160 to track and/or monitor vehicle 160 and predetermined area 158 (i.e., receive opt-in response 161), wherein predetermined area 158 is a predetermine area surrounding vehicle 160. Component 150 may generate knowledge corpus 162 through iterative usage of collecting and storing data associated with predetermined risk factors of predefined risks. Component 150 utilizes IoT sensor set 125 to identify and monitor object 159 while the vehicle is driving or stationary. For example, component 150 identifies, via cameras, radar, ultrasonic, seismic, and LiDAR sensors, and stores the location of trees, street lights, light posts, telephone wires, pot holes, buildings, and other structures or objects (collectively referred to as objects) that component 150 detects and identifies while the vehicle is driving and utilizes global positioning system (GPS) to correspond the identified objects to a location on a map based on the proximity of the object from the vehicle. In various embodiments, knowledge corpus 162 is a public knowledge corpus that any autonomous vehicle that has opt-in can reference to assess risk-based situation(s).

In the depicted embodiment, component 150, via risk monitoring module 164, utilizes IoT sensor set 125 to monitor identified object 159 while the vehicle is driving and/or stationary. Component 150 may monitor, via IoT sensor set 125, object 159 in predetermined area 158 while vehicle 160 is stationary. In various embodiments, component 150, based on identified object 159 in predetermined area 159, component 150 assess the risk of object 159 damaging vehicle 160 prior to enabling vehicle 160 to park in predetermined area 158 and/or while vehicle 160 is parked in predetermined area 158. For example, prior to enabling an autonomous vehicle from parking in an identified parking space, component 150 will assess the risk of the palm trees, lamp post, and telephone pole falling and damaging the autonomous vehicle. Component 150 may ingest omnidirectional input data from IoT sensor set 125 to observe and identify objects in predetermined area 158 and vertical space 157, wherein vertical space 157 is a predetermined area above the vehicle 160 (e.g., a predetermined range from the roof of vehicle 160 and the surrounding area above the roof).

In the depicted embodiment, component 150 receives input from IoT sensor set 125 and identifies object 159 in predetermined area 158 and/or vertical space 157 that represent a potential risk to vehicle 160. For example, component 150 identifies trees, shrubberies, construction equipment, building apparatus, overhead based cabling, and powerlines next to and above the autonomous vehicle. Component 150 may utilize knowledge corpus 162 to calculate and/or assign risk score 169. In the depicted embodiment, component 150, via risk analysis module 168, compares captured data from IoT sensor set 125 with data stored in knowledge corpus 162 to calculate and/or assign risk score 169 to object 159. In various embodiments, if the assigned risk score of one or more objects is above a predetermined threshold, then component 150 issues an audible and/or physical alert or alarm, a responsive prompt to warn the user the potential risk, and/or restrict the user from parking the vehicle in the current or predetermined area.

In the depicted embodiment, component 150 matches object 159 with learned data in knowledge corpus 162 to assign object 159 an overall risk score (risk score 169) and quantify the overall risk to vehicle 160. Component 150 may quantify risk score 169 as a low-risk event, moderate risk event, and high-risk event, wherein a low-risk event corresponds to risk score 169 being below a predetermined threshold, a moderate risk event corresponds to risk score 169 being withing a predetermined range, and a high-risk event corresponds to risk score 169 being above a predetermined threshold. Lower risk situations (objects with a risk score lower than a predetermined threshold) are a minimal risk and will not likely impede a vehicle parking or pulling over. For example, a vehicle parking near a building with an overhead "flag" that extends from the building. The flag mounted to the building might be quantified and scored as a low lever vertical risk, thus an acceptable risk, and no further action would be required, and the autonomous vehicle would be permitted to park in this location. In a different example, vehicle 160 is attempting to park at a local public park; however, component 150 identifies a leaning tree within a predetermined radius of vehicle 160. In this example, component 150 quantifies the risk event as high and sends a notification to vehicle 160, via command module 166, to not park within the identified high-risk area due to a vertical risk.

Additionally, in this example, component 150, via command module 166, issues a command to component 150 to continue to locate a parking space that is not within the predetermine risk area. In various embodiments, if component 150 identifies object 159 as being a high-risk event, then component 150, via command module 166, executes a command for vehicle 160 to autonomously move to predetermined safe area 170. In various embodiments, component 150 may monitor object 159 while vehicle 160 is parked, via IoT sensor set 125, and dynamically adjust the risk score and quantification of the risk score based on any received changes to object 159, vertical space 157 and/or predetermined area 158. For example, if component 150 identifies a leaning tree in park as a moderate risk and the vehicle parks in the moderate risk area then component 150, via IoT sensor set 125, monitors the change in ground vibration pattern along with other historically learned data related to soil, ground vibration, wind, tree age, and tree fall history. In this example, if component 150 detects ground vibration and/or wind then component 150 elevates the identified leaning tree from a moderate risk event to a high-risk event and executes a command for the vehicle to autonomously move from the current parking space to a secondary parking location with no risk events or a low-risk events, wherein component 150 identifies the secondary parking location based on the collected and monitored data. In some embodiments, the secondary parking location can be a predetermined located selected by a user. In various embodiments, component 150, via object recognition and natural language processing, identifies posted signs. In various embodiments, if component 150 identifies a warning, danger, or caution sign then component 150 infers an overhead hazard or danger and identifies the area as having a high-risk event.

Figure 2:
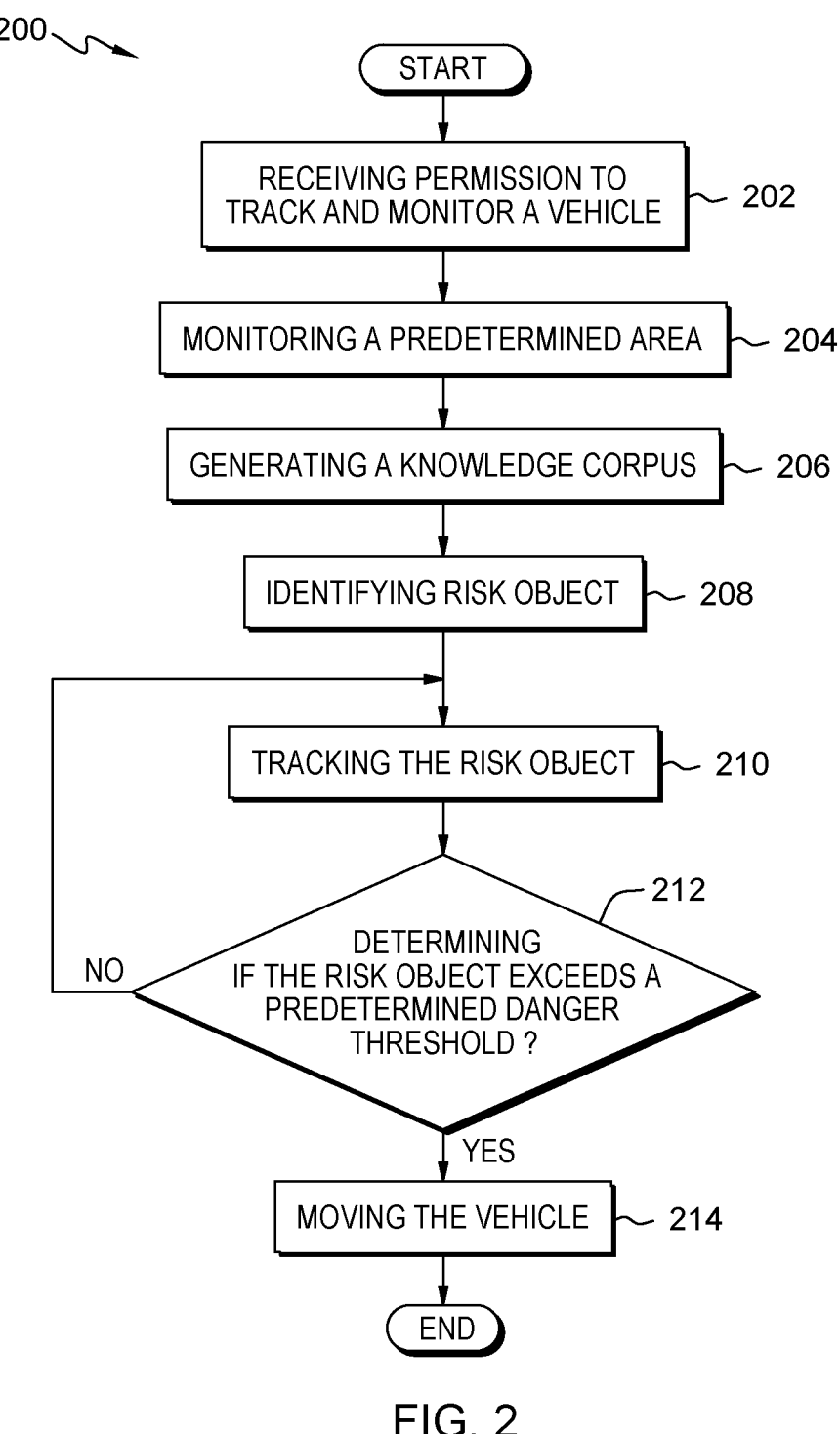
FIG. 2 illustrates operational steps of the impact prevention program, on a server computer within the distributed data processing environment of FIGS. 1A, in accordance with an embodiment of the present invention.

FIG. 2 illustrates operational steps of component 150, generally designated 200, in communication with client computer 101, remote server 104, private cloud 106, EUD 103, and/or public cloud 105, within distributed data processing environment 100, for implementing impact prevention in autonomous vehicles, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 150 receives permission to track and monitor a vehicle. In various embodiments, via UI device set 126, component 150 issues and/or receives permission from a user/owner of a vehicle to track and/or monitor the vehicle and in a predetermined area (i.e., receive opt-in response), wherein a predetermined area is a predetermine area surrounding the vehicle.

In step 204, component 150 monitors a predetermined area surrounding the vehicle. In various embodiments, component 150, via IoT sensor set 125, monitors a predetermined area surrounding the vehicle while the vehicle is in motion or while the vehicle is stationary. In various embodiments, component 150 may monitor one or more objects, within a predetermined distance from the vehicle, while the vehicle is parked, via IoT sensor set 125, and dynamically adjust the risk score and quantification of the risk score based on any received changes to the object, vertical space, and/or predetermined area.

In step 206, component 150 generates a knowledge corpus. In various embodiments, component 150 generates a knowledge corpus based on the data received from the monitoring. Component 150 may generate knowledge corpus 162 through iterative usage of collecting and storing data associated with predetermined risk factors of predefined risks.

In step 208, component 150 identifies a risk object. In various embodiments, component 150, via IoT sensor set 125 and the generated corpus, identifies a risk object in a predetermined area. In various embodiments, while the autonomous vehicle is operating on the road, component 150, via IoT sensor set 126, identifies objects that line the roadside (i.e., roadside specification) of the current road that the vehicle is traveling and identifies whether there is potential vertical risk object that might damage the roof of the vehicle or the vehicle in general. In various embodiments, component 150, via risk monitoring module 164, utilizes IoT sensor set 125 to monitor identified object 159 while the vehicle is driving and/or stationary.

In step 210, component 150 tracks the risk object. In various embodiments, component 150, via IoT sensor set, tracks/monitors the identified risk object. In the depicted embodiment, via UI device set 123, component 150 issues and/or receives permission from a user/owner of vehicle 160 to track and/or monitor vehicle 160 and predetermined area 158 (i.e., receive opt-in response 161), wherein predetermined area 158 is a predetermine area surrounding vehicle 160. For example, if component 150 identifies a tree leaning while the vehicle is stopped at a local park then component 150 flags the leaning tree as a moderate risk and that the vehicle is stopped in the moderate risk area. In this example component 150, via IoT sensor set 125, monitors the change in ground vibration pattern along with other historically learned data related to soil, ground vibration, wind, tree age, and tree fall history to dynamically adjust the risk score based on the monitored data.

In step 212, component 150 determines if the risk object exceeds a predetermined danger threshold. In various embodiments, component 150 matches the object with learned data in the knowledge corpus to assign an object an overall risk score (risk score) and quantify the overall risk to the vehicle. Component 150 may quantify the risk score as a low-risk event, moderate risk event, and high-risk event, wherein a low-risk event corresponds to the risk score being below a predetermined threshold, a moderate risk event corresponds to the risk score being withing a predetermined range, and a high-risk event corresponds to the risk score being above a predetermined threshold. Lower risk situations (objects with a risk score lower than a predetermined threshold) are a minimal risk and will not likely impede a vehicle parking or pulling over.

In step 214, component 150 moves the vehicle. In various embodiments, responsive to the risk-score being above a predetermined threshold (high-risk event), component 150 issues command to the vehicle to autonomously move the vehicle to a predetermined safe location.

Figure 3:
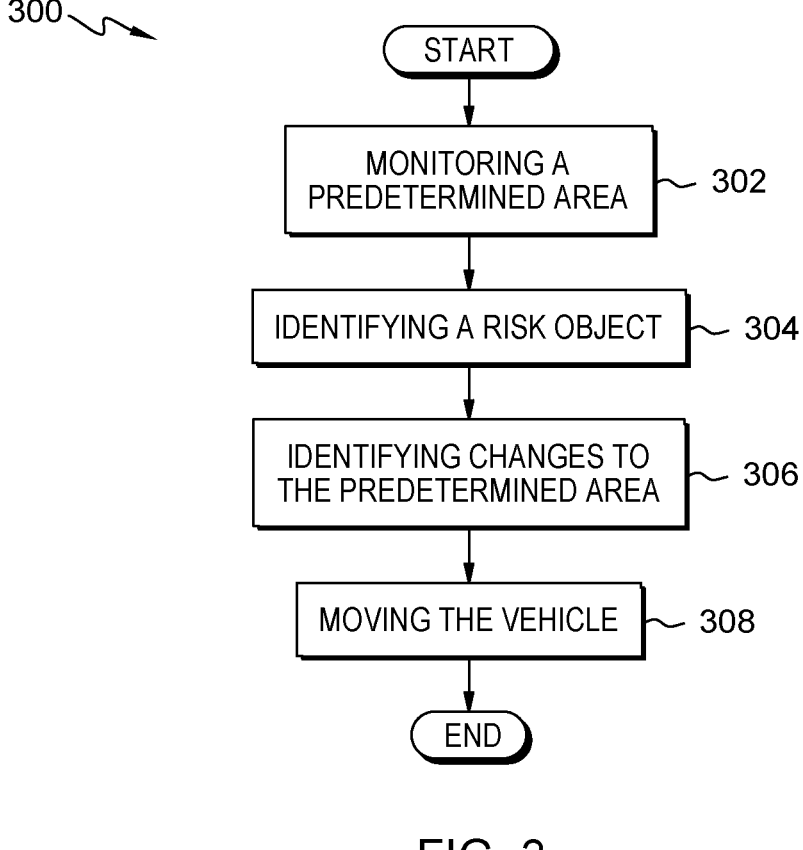
FIG. 3 illustrates operational steps of the impact prevention program, on a server computer within the distributed data processing environment of FIGS. 1A, in accordance with an embodiment of the present invention.

FIG. 3 illustrates operational steps of component 150, generally designated 200, in communication with client computer 101, remote server 104, private cloud 106, EUD 103, and/or public cloud 105, within distributed data processing environment 100, for implementing impact prevention in autonomous vehicles, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 150 monitors a predetermined area. In various embodiments, component 150, via IoT sensor set, a predetermined area.

In step 304, component 150 identifies a risk object. In various embodiments, component 150 identifies one or more risk objects in a predetermined area.

In step 306, component 150 identifies changes to the predetermined area. In various embodiments, component 150 monitors, via IoT sensor set, the predetermined area for changes to the predetermined are and/or identified object.

In step 308, component 150 moves the vehicle. In various embodiments, responsive to the risk-score being above a predetermined threshold (high-risk event), component 150 issues command to the vehicle to autonomously move the vehicle to a predetermined safe location.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving impact prevention in autonomous vehicles, the computer-implemented method comprising:
generating a knowledge corpus based on data collected, from one or more internet of thing (IoT) sensors, associated with one or more predetermined risk factors of one or more predefined risks over time;
receiving, from the one or more IoT sensors, input data to observe a vertical space above a vehicle;
identifying an object in a predetermined area based on the input data and the knowledge corpus;
updating an electronic risk map with the object and vulnerability characteristics, associated with the object, derived from the knowledge corpus;
utilizing the knowledge corpus, the electronic risk map, and the input data to generate a risk score for the identified object; and
responsive to the risk score being above a predetermined threshold, issuing a command for the vehicle to continue to progress to a predetermined safe zone.

2. The computer-implemented method of claim 1, further comprising:
receiving permission to track and monitor the vehicle.

3. The computer-implemented method of claim 1, further comprising:
tracking, by the one or more IoT sensors, the object in the predetermined area.

4. The computer-implemented method of claim 1, further comprising:
instructing the vehicle to autonomously move to the predetermined safe zone.

5. The computer-implemented method of claim 1, further comprising:
dynamically adjusting the risk score and quantification of the risk score based on a received change to the object, the vertical space, or the predetermined area.

6. The computer-implemented method of claim 5, further comprising:
monitoring, by the one or more IoT sensors, a change in ground vibration pattern and to historically learned data related to soil, ground vibration, wind, tree age, and tree fall history.

7. The computer-implemented method of claim 1,
identifying one or more objects that line a roadside of a current road that the vehicle is traveling; and
identifying a potential risk of the one or more objects impacting the vehicle.

8. A computer system for improving impact prevention in autonomous vehicles, the computer system comprising:
one or more computer processors;
one or more computer readable storage devices;
program instructions stored on the one or more computer readable storage devices for execution by at least one of the one or more computer processors, the stored program instructions comprising:
program instructions to generate a knowledge corpus based on data collected, from one or more internet of thing (IoT) sensors, associated with one or more predetermined risk factors of one or more predefined risks over time;
program instructions to receive, from the one or more IoT sensors, input data to observe a vertical space above a vehicle;
program instructions to identify an object in a predetermined area based on the input data and the knowledge corpus;
program instructions to update an electronic risk map with the object and vulnerability characteristics, associated with the object, derived from the knowledge corpus;
program instructions to utilize the knowledge corpus, the electronic risk map, and the input data to generate a risk score for the identified object; and
responsive to the risk score being above a predetermined threshold, program instructions to issue a command for the vehicle to continue to progress to a predetermined safe zone.

9. The computer system of claim 8, further comprising:
program instructions to receive permission to track and monitor the vehicle.

10. The computer system of claim 8, further comprising:
program instructions to track, by the one or more IoT sensors, the object in the predetermined area.

11. The computer system of claim 8, further comprising:
program instructions to instruct the vehicle to autonomously move to the predetermined safe zone.

12. The computer system of claim 8, further comprising:
program instructions to dynamically adjust the risk score and quantification of the risk score based on a received change to the object, the vertical space, or the predetermined area.

13. The computer system of claim 12, further comprising:
program instructions to monitor, by the one or more IoT sensors, a change in ground vibration pattern and to historically learned data related to soil, ground vibration, wind, tree age, and tree fall history.

14. The computer system of claim 8, program instructions to identify one or more objects that line a roadside of a current road that the vehicle is traveling; and program instructions to identify a potential risk of the one or more objects that might damage the vehicle.

15. A computer program product for improving impact prevention in autonomous vehicles, the computer program product comprising:

one or more computer readable storage devices and program instructions stored on the one or more computer readable storage devices, the stored program instructions comprising:

program instructions to generate a knowledge corpus based on data collected, from one or more internet of thing (IoT) sensors, associated with one or more predetermined risk factors of one or more predefined risks over time;

program instructions to receive, from the one or more IoT sensors, input data to observe a vertical space above a vehicle;

program instructions to identify an object in a predetermined area based on the input data and the knowledge corpus;

program instructions to update an electronic risk map with the object and vulnerability characteristics, associated with the object, derived from the knowledge corpus;

program instructions to utilize the knowledge corpus, the electronic risk map, and the input data to generate a risk score for the identified object; and responsive to the risk score being above a predetermined threshold, program instructions to issue a command for the vehicle to continue to progress to a predetermined safe zone.

16. The computer program product of claim 15, further comprising:

program instructions to receive permission to track and monitor the vehicle.

17. The computer program product of claim 15, further comprising:

program instructions to track, by the one or more IoT sensors, the object in the predetermined area.

18. The computer program product of claim 15, further comprising:

program instructions to instruct the vehicle to autonomously move to the predetermined safe zone.

19. The computer program product of claim 15, further comprising:

program instructions to dynamically adjust the risk score and quantification of the risk score based on a received change to the object, the vertical space, or the predetermined area; and program instructions to monitor, by the one or more IoT sensors, a change in ground vibration pattern and to historically learned data related to soil, ground vibration, wind, tree age, and tree fall history.

20. The computer program product of claim 15, program instructions to identify one or more objects that line a roadside of a current road that the vehicle is traveling; and program instructions to identify a potential risk of the one or more objects that might damage the vehicle.

\* \* \* \* \*